United States Patent
Volans

[15] 3,679,111
[45] July 25, 1972

[54] APPARATUS FOR THE PRODUCTION OF FIBROUS MATERIALS

[72] Inventor: Peter Volans, Chepstow, England
[73] Assignee: Monsanto Chemicals Limited, London, England
[22] Filed: June 9, 1970
[21] Appl. No.: 44,831

[52] U.S. Cl. .............................225/97, 225/3, 264/DIG. 8
[51] Int. Cl. ...........................................................B26f 3/02
[58] Field of Search ..............225/3, 93, 97; 57/31; 264/154, 264/288, DIG. 8; 93/1

[56] References Cited

UNITED STATES PATENTS

| | | | |
|---|---|---|---|
| 3,035,497 | 5/1962 | Whitehead et al. | 93/1 |
| 3,233,029 | 2/1966 | Rasnussen | 264/288 |
| 3,496,259 | 2/1970 | Guenther | 225/3 X |
| 3,511,901 | 5/1970 | Brown | 225/3 X |

Primary Examiner—Frank T. Yost
Attorney—J. Bowen Ross, Jr., Russell E. Weinkauf, John D. Upham and Neal E. Willis

[57] ABSTRACT

Orientated and foamed thermoplastic material is fibrillated by passing the material through a nip comprised of a pair of rotatable rolls each having a series of radially extending ribs with the ribs of one roll intermeshing with the ribs of another roll, the rolls being movable with respect to each other so that the degree of interpenetration of the ribs may be controlled.

3 Claims, 5 Drawing Figures

PATENTED JUL 25 1972 3,679,111

INVENTOR.
PETER VOLANS
BY J. Bowen Ross, Jr.
ATTORNEY

APPARATUS FOR THE PRODUCTION OF FIBROUS MATERIALS

BACKGROUND OF THE INVENTION

1. Field of the Invention

This invention relates to the production of fibrous materials, and in particular, to a process for the production of fibrous structures by the foaming and fibrillation of orientated thermoplastic materials.

2. Description of the Prior Art

British Pat. No. 1,114,151 describes the production of a novel fiber assembly by drawing an extruded foamed thermoplastic material so that it becomes orientated essentially in one direction and subjecting the drawn material to forces such that the walls of the foam are broken down and converted into a three-dimensional structure of interconnected fiber elements. The process of breaking down such materials is known by the term "fibrillation."

A prior art apparatus for fibrillating such foamed and orientated thermoplastic materials is shown and described in U.S. Pat. No. 3,486,674. The apparatus consisted of pairs of rotatable and reciprocable pressure rolls which fibrillate the foamed material along a direction which is transverse to the axes of the rolls. The apparatus is primarily directed to ribbon material while the subject invention is directed to the fibrillation of sheet or board material.

SUMMARY OF THE INVENTION

The process of this invention comprises passing an orientated thermoplastic material through the nip between a pair of rotating rolls, each roll having a series of circumferential ribs, the ribs of one roll intermeshing with those of the other, so as to cause transverse stretching resulting in the fibrillation of the orientated thermoplastic material. Preferably the thermoplastic material is an orientated extruded foamed thermoplastic material.

The invention also includes an apparatus which comprises a pair or rotatable rolls each having a series of circumferential ribs, the ribs of one roll intermeshing with those of the other, and means for adjusting the relative position of the rolls and the degree of interpenetration of the ribs.

The fibrous materials produced by the process can be used as non-woven fabrics or as yarns and they can be in a wide range of forms depending partly on the nature of the starting material but more especially on the fibrillating apparatus employed. The degree of fibrillation depends on a number of factors described below.

DETAILED DESCRIPTION OF THE PREFERRED EMBODIMENT

The apparatus consists of a pair of rotatable rolls 1 and 2 with each having a series of spaced apart radially extending ribs 3. The outward surfaces of ribs 3 are slightly roughened. The rolls are positioned so that the ribs on one roll intermesh with those on the other roll and the axes of the rolls are adjustable in separation by means 7 so that the depth of intermeshing of the ribs can be varied.

In operation thermoplastic material 4 is passed between the rolls in the direction shown by the arrow and is subjected to the action of the intermeshing ribs, the rolls being driven in opposed senses so that the intermeshing parts of the ribs move in the same direction. The thermoplastic material is withdrawn from the rolls as a fibrillated web.

When the orientated extruded foamed thermoplastic material is passed between the rolls it is subjected to a transverse stretching force since the material is deformed by the interpenetrating ribs. This stretching force breaks down the material into a fibrous structure.

Figure 4:
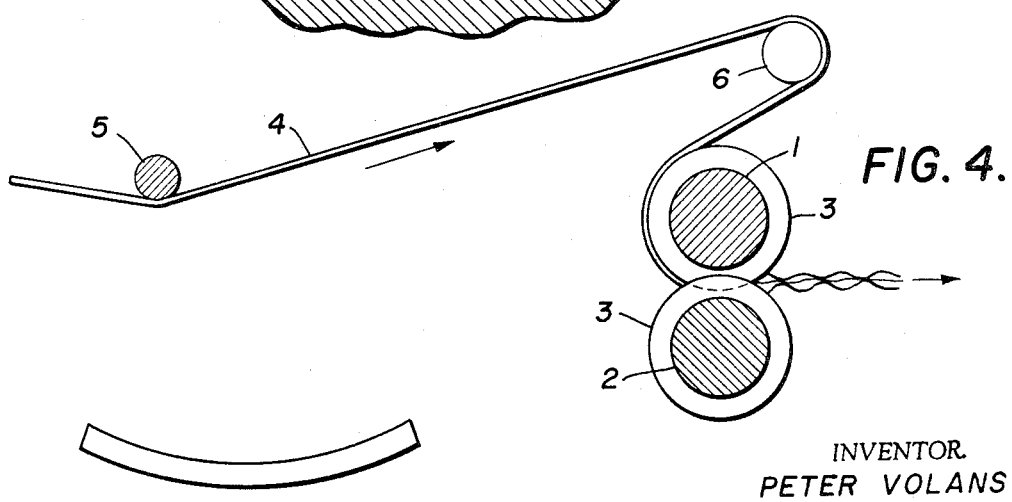
FIG. 4 is a section view also showing a spreader bar and rotatable idler roll.
Figure 5:
FIG. 5 is a plan view of the spreader bar.

In an especially preferred process of the invention as shown in FIG. 4, a preliminary transverse stretching force can be applied to the thermoplastic material so as to ensure even distribution of the material as it passes through the nip between the pair of rotating rolls. The preliminary stretching force can be effected by passing the thermoplastic material across a surface curved in a direction transverse to the thermoplastic material and an associated idler roll to flatten out the thermoplastic material before it passes through the nip between the pair of rotating rolls.

In operation thermoplastic material 4 is passed across spreader bar 5 in the direction shown by the arrow. Spreader bar 5 exerts a transverse stretching force on thermoplastic material 4 since the material is deformed to take up the curved configuration of the bar. Subsequently, thermoplastic material 4 is passed around rotatable idler roll 6 which flattens out the thermoplastic material before it is passed through the nip between a pair of rotating rolls 1 and 2 and drawn from the rolls by haul-off mechanism (now shown).

Figure 3:
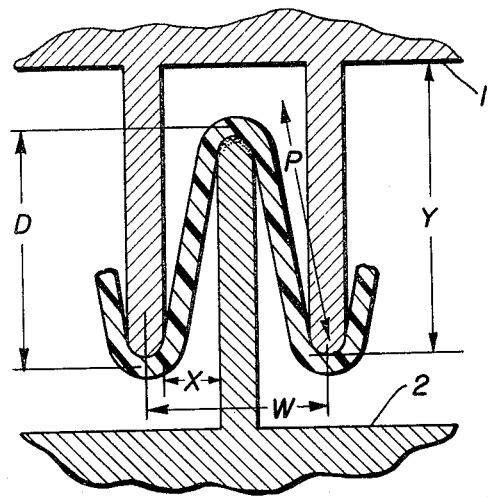
FIG. 3 is an enlarged section showing the degree of interpenetration of the ribs of one roll with those of the other and the way in which the orientated thermoplastic material is stretched as it passes through the nip formed by the ribs.

The geometry of the ribs and the rib separation is determined by a number of factors. Referring to FIG. 3, it can be seen that the adjustment of the rolls varies the degree if interpenetration of the rib projections. The degree of interpenetration is denoted by the symbol $d$, the separation of adjacent ribs on one roll by the symbol $w$, the depth of the rib by $y$, and the length of the thermoplastic material between two adjacent intermeshing ribs is represented by $p$, the distance between the two intermeshing ribs being $x$. The ratio $R$, where $R = 2p/w$, is a measure of the transverse stretching force to which the thermoplastic material is subjected as it is passed between the rolls. This stretching force breaks down the material into a fibrous structure.

The radio $R$ can otherwise be expressed in terms of the depth of penetration of the ribs:

$R = 2 p/w$
$= 2 \sqrt{w^2/4 + d^2} / w$
$= \sqrt{w^2 + 4d^2} / w$

Equation 1. $R = \sqrt{1 + 4(d/w)^2}$

From Equation 1 it can be seen that the ratio $R$ depends on the depth of penetration of the ribs, $d$. The greater the value of $d$, for a given rib separation $w$, the greater the stretching force exerted on the thermoplastic material. Thus, adjustment of the axes of the rolls, which alters the depth of penetration of the ribs is a factor in controlling fibrillation. Also, a large value of $w$ reduces $R$.

Another important consideration in determining the geometry and separation of the ribs is the thickness of the material to be fibrillated. Thus, the distance $x$, between adjacent intermeshing ribs is preferably equal to or greater than the thickness of the material. The depth of the rib $y$ is preferably equal to or greater than the distance $w$ between adjacent ribs on the roll. In general, the ribs have a depth $y$ of from ⅛ to 1 inch but the appropriate value of $y$ will depend on the thickness of the material to be fibrillated and the degree of intermeshing that is required, since the value of $d$ is limited by the depth of the rib $y$.

The ribs are as thin as practicable consistent with their not cutting the material and this means they usually have a thickness of from one, thirty-second to three-sixteenth inch. In order to obtain uniform fibrillating of the material, the rib projections are preferably disposed at regular intervals and usually at a distance, $w$, of from three-sixteenths to three-eighths inch apart.

It is preferred that the ribs should be thin plate-like projections which are integrally connected to the roll but a set of discs and cylindrical segments bolted together to form a similar structure may also be used. The outer surface of the ribs, that surface in direct contact with the material, is often slightly roughened or knurled to ensure that side slip of the material passing between the rolls does not occur.

The exact dimensions of the rolls will depend primarily on the dimensions of the material being processed with their length being at least as great as the width of the material. Generally, a relatively large diameter roll is preferred so that the material is not subjected to too sudden a deformation. With large rolls the material is in contact with the intermeshing ribs for a longer interval of time. The diameter of the roll should be large relative to the depth of the ribs, which is preferably large compared with the thickness of the material to be fibrillated. The diameter can for example be from 1 to 12 inches with both rolls usually being of the same diameter. When operating the process, it is preferred that the peripheral speed of the rolls be from 10 to 1000 feet per minute to match the production rate of the drawn foam. The rolls can be driven by hand or preferably by mechanical means although it is also possible to drive the rolls by the frictional effect of the material drawn through the rolls by a haul-off mechanism. As indicated above, fibrillating may also be controlled by adjusting the axes of the rolls which varies the degree of interpenetration of the rib projection, the greater the stretching force to which the polymer is subjected. Good results may be obtained by passing the material to be fibrillated in sequence through a series of meshing roll systems of differing dimensions and interpenetrations.

In general the temperature at which the fibrillation is carried out is room temperature, 20°C., or somewhat higher, perhaps up to 30°C. In the instance of certain specific thermoplastic resins (particularly those which possess a degree of elasticity and are therefore relatively tough), and of elastomeric materials in general, the temperature used is normally lower than room temperature, for instance 5°C. or 0°C. or even lower.

The thermoplastic material is preferably one capable of being formed into an extruded foam. It is in practice usually a synthetic material, and one that is fibrillatable. High density polyethylene is the most preferred material for use in the present invention. Excellent results are obtained with a thermoplastic synthetic material, for example a polymer or copolymer obtained by polymerization (which includes copolymerization) of an ethylenically unsaturated monomer. Such a monomer can be an ethylenically unsaturated hydrocarbon, but it can be for instance a nitrile, such as acrylonitrile, or methacrylonitrile; vinyl or vinylidene chloride; a vinyl ester, such as vinyl acetate, or an acrylate ester, such as ethyl acrylate or methyl methacrylate. Where the monomer is a hydrocarbon this can be a mono-olefin, a diene, or a vinyl-substituted benzene, for instance ethylene, propylene, a butylene, a pentene or a hexane; butadiene; or a vinyl-substituted benzene, such as styrene or α-methylstyrene. For example the polymer can be high density polyethylene, crystalline polypropylene, or polystyrene or a toughened polystyrene. A copolymer can in general be for instance one of a type which will impart a degree of flame-retardance to the copolymer, and an example of such a substance is a vinyl halide, such as vinyl chloride, vinyl bromide or vinylidene chloride. Examples of other comonomers are vinylpyrollidone and a vinylpyridine such as methyl vinylpyridine. A copolymer can for example be one derived from two hydrocarbon monomers, such as ethylene-propylene or styrene-butadiene copolymer, or a hydrocarbon and a different type of monomer, such as for example acrylonitrile and a minor proportion of vinyl acetate. The thermoplastic material can also consist of a mixture of two or more polymers or copolymers; it can for example comprise a mixture of a copolymer of acrylonitrile with a minor amount of vinyl acetate (in the region for instance of 10 percent by weight) and polyvinyl chloride; or a mixture of an acrylonitrile-vinyl acetate copolymer and a copolymer of acrylonitrile with methylvinylpyridine.

Preferably, the polymer is a thermoplastic resin material but an amount of an elastomeric material may be incorporated therein. For example, a copolymer derived from a diene monomer (such as butadiene) may be desired to impart some degree of elastomeric properties to the copolymer. Natural rubber or a synthetic rubber, such as polybutadiene, styrene-butadiene or acrylonitrile butadiene rubber may also be used. The thermoplastic resin material can be non-crystalline (as in amorphous polystyrene) or crystalline (as in crystalline polyethylene or polypropylene). Other types of synthetic materials that can be employed include polyamides, such as nylon 11 and nylon 66, polyurethanes, polylactams, such as polycaprolactam, and polyesters, such as of the polyethylene terephthalate type. Where the thermoplastic material is regenerated naturel fiber, it is preferably one based on cellulose, for example rayon, cellulose acetate, cellulose triacetate or cellulose acetatebutyrate.

The extruded foamed thermoplastic material used in the preferred process of the invention can be formed by any of the convention processes of foaming and may be extruded in the form of a sheet or board, in which case it will often have been made using a slit die. Sheet material can also be produced using an annular die by extrusion of a tube of foamed material, which can either be slit longitudinally and opened out into a sheet or collapsed so as to form a sheet of double thickness.

The orientation of the extruded foamed thermoplastic material in the preferred process of the invention is achieved by drawing the extruded foamed thermoplastic material so that it becomes orientated essentially in one direction, the cells comprising the foam being elongated. In practice, it is convenient to draw the foam along the direction in which it has been extruded (that is to say it is drawn uniaxially), but, if desired, the direction of drawing can be at right angles to the direction of extrusion. The drawn material almost always has a slightly higher density than the material before drawing.

It should be understood that although the process of the present invention has been described with particular reference to the fibrillation of orientated foamed thermoplastic materials, the invention also includes the fibrillation of an orientated unfoamed thermoplastic material. However, it is preferred to use an orientated foam.

EXAMPLE

This Example describes the production of a fibrillated web of high density polyethylene by a process according to the invention.

Figure 1:
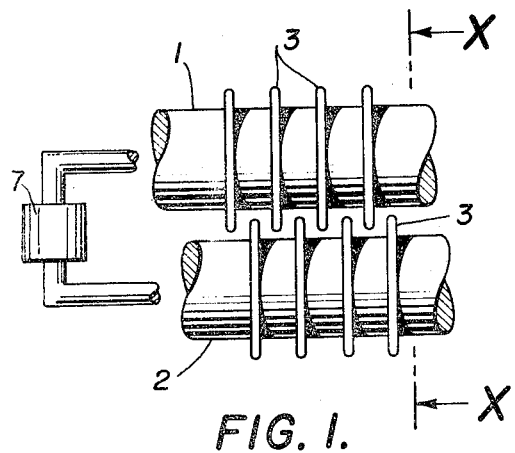
FIG. 1 shows a side view of a pair of rotatable rolls.
Figure 2:
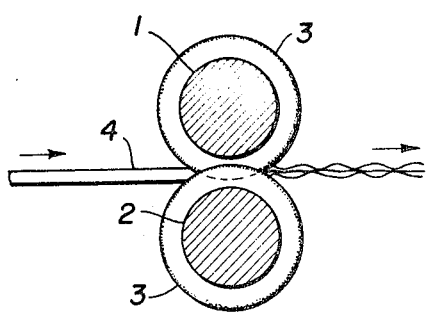
FIG. 2 shows a section through the pair of rolls along the line X — X of FIG. 1 showing the manner in which the orientated extruded foamed thermoplastic material is passed through the rolls.

An apparatus similar to that shown in FIGS. 1, 2 and 3 was used. Two identical rolls had a diameter of 2 inches with a regular series of rib projections each uniformly projecting 0.25 inch from the surface of the roll. The rolls were positioned so that there was an interpenetration of the rib projections of 0.20 inch. After setting the rolls in motion a sheet of orientated extruded foamed polyethylene having a width of 4 inches was driven through the rolls in the direction of its orientation, at a rate of 2 feet per minute. There was produced a fibrillated polyethylene web having a tensile strength of 7.5 pounds per inch per ounce per square yard.

The web was evenly fibrillated and had a three dimensional network structure extending throughout its volume. It was soft to the touch and could be stretched along its width. The fiber elements were orientated in the same direction as the original foamed polyethylene.

What is claimed is:

1. An apparatus which comprises a pair of rotatable rolls being spaced apart and having parallel axes, ribs having roughened exterior surfaces and mounted on said rolls to extend radially outwardly, said ribs being spaced apart along the length of said rolls, with the ribs of one roll intermeshing and remaining out of contact with the ribs of another roll, and means for adjusting the relative position of said rolls and the degree of interpenetration of said ribs so as to form a controlled nip, the nip being adaptable to receive and fibrillate an orientated thermoplastic material.

2. The apparatus of claim 1 wherein said rolls are rotatable in opposite directions.

3. The apparatus of claim 2 wherein means is provided for applying a lateral stretch to said material prior to said material being presented to said nip.

* * * * *